Patented Apr. 17, 1923.

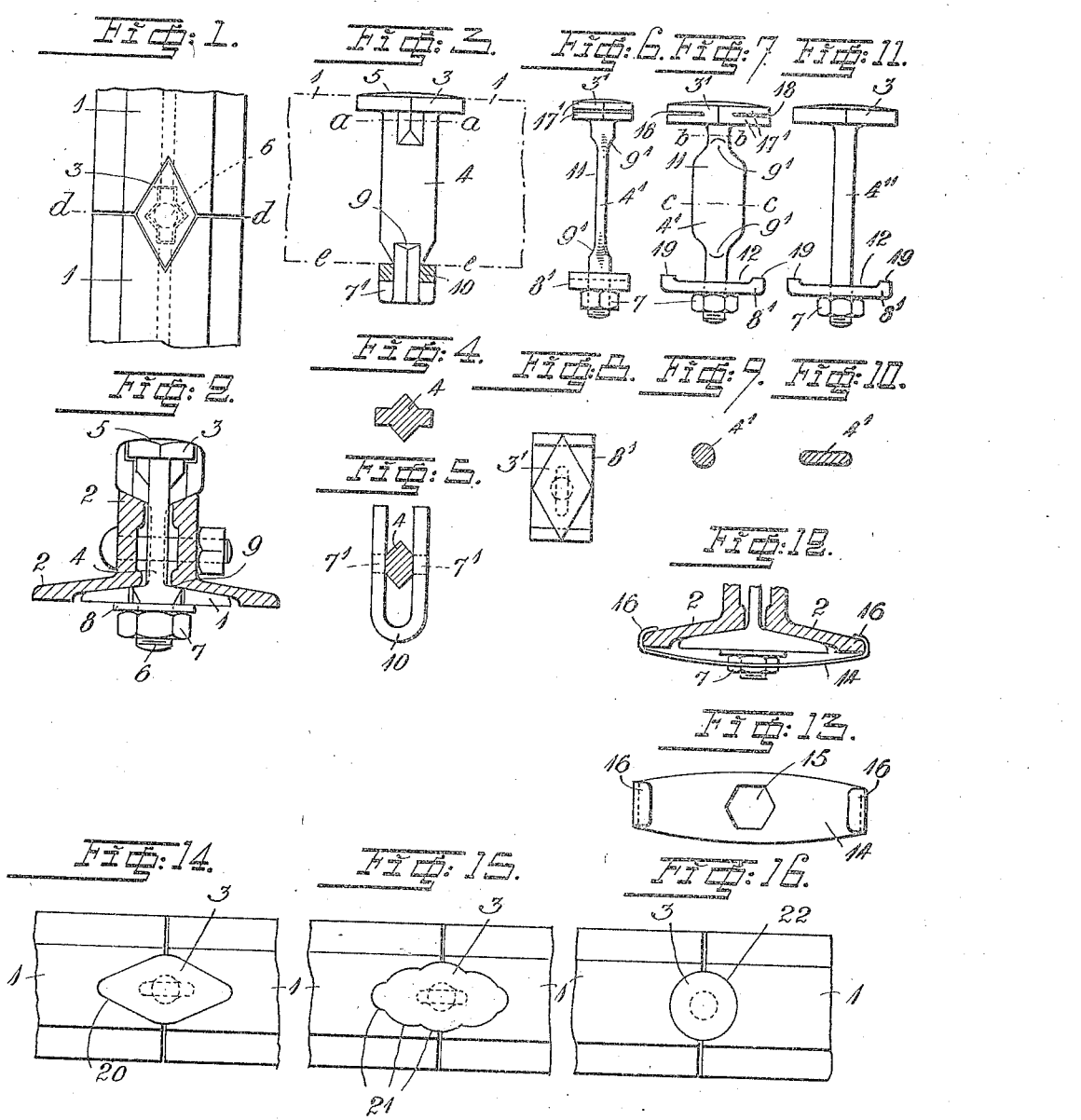

1,451,766

UNITED STATES PATENT OFFICE.

LEANDER EKBERG, OF VASTERAS, SWEDEN.

RAIL JOINT.

Application filed January 11, 1921. Serial No. 436,418.

*To all whom it may concern:*

Be it known that I, LEANDER EKBERG, subject of the King of Sweden, residing at Vasteras, in the Kingdom of Sweden, have invented new and useful Improvements in Rail Joints, of which the following is a specification.

This invention relates to an improvement in rail joints for railways or tramways, its object being to obviate the occurrence of shocks and "hammering" and the ensuing injury to rolling stock as well as the noisy thud of the cars. This object is attained by the use of a special joining piece which forms the running or rolling surface for the wheels at the actual joint, the said piece being firmly attached to the upper surface of the rail by a vertical bolt, or the like.

In endeavoring to solve the vastly important problem of a shock-free rail joint, inventors have proposed and also caused to be executed in practice (1) various constructions in which the rail ends mesh or lap with one another (2) constructions in which a separate member has been arranged to facilitate the shock-free transition. This latter method of handling the problem has, so far as I know, not hitherto led to any practical result, owing to the fact that, in general, one member has been used to facilitate the transition and other members to impart the necessary strength to the joint. In theory this method may be quite correct, but in practice it has not proved feasible to carry out such a construction without impairing the strength of the joint; nor has it been found possible by this method to obviate those movements in the joint which impede the functions of the transmitting member.

The present invention consists in the arrangement of a transmitting member which also has a reinforcing function, whereby the said difficulties in construction are obviated.

By way of example, a form of the invention is illustrated on the accompanying drawing.

Fig. 1 is a plan view of a rail joint.

Fig. 2 is a vertical section along the line *d—d* in Fig. 1 at the joint, the joining piece however, being shown without cut.

Fig. 3 is a side view of the joining piece with the rail shown in dash and dot lines.

Figs. 4 and 5 are cross sections of the joining piece along the lines *a—a* and *e—e* respectively in Fig. 3.

Figs. 6 and 7 are lateral views, seen from two directions at right angles to one another, of another form of the joining piece or the joining bolt.

Fig. 8 is a plan view from above of the form illustrated in Figs. 6 and 7.

Figs. 9 and 10 are cross sections along the lines *b—b* and *c—c* respectively in Fig. 7.

Fig. 11 illustrates in a similar manner to Fig. 6 another form of the joining piece.

Fig. 12 shows in vertical section, and Fig. 13 from above, a locking device for the nut arranged under the rail foot.

Figs. 14, 15 and 16 show different forms of the joining piece viewed from above.

The invention will be described first with reference to Figs. 1—4.

The two rail ends 1 are joined with the lap angle iron or fish-iron 2, and in the centre of the joint proper is inserted a joining piece. The latter is in the form of a bolt with a head 3, whose upper surface 5 is somewhat convex, so that the running track for the wheels which is formed by this head will be slightly higher than the running surface of the rails 1. The joining piece is provided with a shaft 4, which, on making the rail joint, is inserted in vertical grooves matching its shape (these grooves are indicated by dotted lines in Fig. 1) in the rail ends. At the lower end the shaft 4 is expanded into a bolt 6 (see Fig. 2) provided with a nut 7 and a washer 8. The washer may be replaced by a bifurcated member 10 or the like (see Fig. 5), which is inserted between the rail foot and the nut, or the nut may be eliminated and the bolt 4 formed at its lower end with laterally extending portions 7', as shown in Fig. 3, forming a head between which and the rail the member 10 may straddle the bolt 4.

As appears from Figs. 2 and 3, the abutting ends of the rails are provided in their top surfaces with recesses of such size and form that when in abutting relation a depression is formed for the reception of the head 3 of the joining member, sufficient playroom being left for the expansion of the rail. On tightening the nut 7, or on driving in the member 10, the legs of which may be slightly tapered so as to exert a wedging action, the head 3 will be forced down into the recesses in the rails and will thereby brace the two rail ends in a vertical direction. This bracing may also be effected by providing the bolt shaft with, or expanding the same to form, shoulder pieces 9 against which the two lap angle irons 2 press (see Fig. 2). For this purpose, the lower side of the head must of course be placed sufficiently far up on the shaft not to impede the direct fit of the lap angle iron against the lower side of the rail head.

The head 3, viewed from above, according to Figs. 14 and 15, is arranged in the shape of a double wedge with the somewhat rounded points facing the longitudinal direction of the rail, whereby the wheel pressure is successively transmitted to the joining member. The joining member and the grooves for the latter in the rail ends are, moreover, so shaped that the joining member can be inserted in place from above between two rail ends abutting against one another.

Another form is shown in Figs. 6—10. Here the head 3′, forming the running track, consists of one or more springs 17″, running in the longitudinal direction of the rail, which springs at the centre part 18 are welded together; or else, as shown in Fig. 7, the head 3′ is at its ends provided with elastic tongues 17′ formed by an incision 18 in the head. The shaft 4′ is in this form cylindrical, except that in the centre part it is provided with recesses or flattenings 11, i. e. squarely shaped (see Fig. 10) in order to provide room for the lap iron. The nut washer 8′ may, as is shown by Fig. 7, be provided with a recess 12, so that the surfaces or shoulders 19 resting against the rail ends are placed a little apart from the joint, in order that the rail ends may be given free play, in case they should be bent down at the joint; this arrangement obviates the bolt being broken off when the wheels pass over the joint.

Fig. 11 shows a form according to which the bolt 4″ is round throughout. It may be provided with a locking device for the nut, for example of the construction shown in Figs. 12 and 13. The latter consists of a plate strip 14 provided with an aperture 15, corresponding to the shape and size of the nut, and encircling said nut, whereupon the ends 16 of the plate strip are folded over the rail foot 2 in the manner shown in Fig. 12, whereby the nut is securely locked.

In Figs. 14, 15 and 16 are illustrated some different forms of the bolt head of the joining member. The feature common to all these forms is that the bolt head is shaped wholly or partially by lines describing the arc of a circle, for the purpose of enabling the required recesses in the rail ends to be made by drilling. The invention may thus easily be adapted to rail tracks already laid out, by the use of a transportable drilling machine. For this purpose, the bolt head, according to Fig. 14, may be given an essentially elliptic shape with the end parts curved along arcs of circles (the lines 20). According to Fig. 15, the head has substantially the same shape, but is bounded by a number of lines 21, each describing the arc of a circle. According to Fig. 16, the head is bounded by a circular line 22, in other words, it is round.

The rail joint above described, may be placed either in the usual manner between two sleepers, with or without cross ties, or on a double sleeper, or else on one single sleeper, which in that case ought to be of larger dimensions than the others. In certain cases it may be found suitable that the joining piece should also transmit the wheel pressure direct to the sleeper.

The advantages of this rail joint are incontestable. While, on the one hand, the joining piece will transmit the wheels from the one rail to the other without shock or hammering, its adaption necessitates no essential alteration in the construction of rail joints hitherto in use: on the contrary, it conduces greatly to their reinforcement, especially as it resists the transverse forces, which play so important a rôle in the construction of joints, by means of tensile stress and not, as in the case of the lap angle iron, by means of compressive and shearing stresses.

From the foregoing it will be seen that in all forms of the device herein illustrated, the so-called joining piece or member is so formed and disposed on the rails that its greatest width is immediately over the joint between the rails, thus forming a bridge which is almost as wide as the rail itself.

Having thus described my invention, I declare, that what I claim is:

1. A rail joint comprising, in combination a pair of rail ends in abutting relation and each provided with a vertical recess in its abutting face and a recess in its top surface, a pair of lap irons one at each side of the rails and bridging the abutting ends, a joining member seated in the surface recesses of the rails and having a depending portion extending through said vertical recesses, said depending portion having means for engaging said lap irons, and means for securing said joining member in position, said means directly engaging the under surface of the rails and bridging the joint therebetween.

2. A rail joint, comprising, in combination, a pair of rail ends in abutting relation and each provided with a vertical recess in its abutting face and a recess in its top surface, a pair of lap irons one at each side of the rails and bridging the joint therebetween, a joining member seated in the surface recesses of the rails and having a depending portion extending through said vertical recesses, said depending portion being provided with flattened portions forming shoulders for engaging said lap irons, and means carried by said depending portion for securing said joining member in position, said means directly engaging the under surface of the rails and bridging the joint.

3. The combination with the abutting ends of a pair of rails, of a flexible joining member countersunk into said rails and bridging the joint therebetween, a depending portion connected to said member and extending between the abutting ends of the rails, and means secured to said depending portion and directly in contact with the under surface of said rails for securing said member in position on the rails.

4. The combination with the abutting ends of a pair of rails, of a joining member countersunk into said rails and having its greatest width bridging the joint between the ends of the rails, a depending portion carried by said member and extending between the abutting ends of the rails, a nut threaded on the lower end of said depending portion and adapted to bear against the under-surface of said rails, and means for locking said nut against rotation on said depending member.

5. The combination with the abutting ends of a pair of rails, of a joining member countersunk into said rails, the periphery of said member being in the form of arcs of circles, said member having its greatest width immediately over the joint between the abutting ends of the rails, a depending member carried by said joining member and extending between the abutting ends of the rails and means secured to said depending member and contacting with the under surface of the rails for securing said joining member in position, said means also bridging the joint between the rails.

In testimony whereof I have signed my name to this specification.

LEANDER EKBERG.

Witnesses:
AUG. HAGELIN,
E. NILON.